United States Patent [19]

Farley

[11] Patent Number: 5,038,433

[45] Date of Patent: * Aug. 13, 1991

[54] ANATOMICALLY CONFORMABLE FOAM SUPPORT PAD

[76] Inventor: David L. Farley, 18672 Evergreen Ave., Yorba Linda, Calif. 92686

[ * ] Notice: The portion of the term of this patent subsequent to Nov. 14, 2006 has been disclaimed.

[21] Appl. No.: 328,236

[22] Filed: Mar. 24, 1989

[51] Int. Cl.$^5$ .................. A47C 27/14; A61G 7/04
[52] U.S. Cl. ............................. 5/464; 5/481
[58] Field of Search .................. 5/446, 461, 464, 468, 5/481

[56] References Cited

U.S. PATENT DOCUMENTS

| | | |
|---|---|---|
| 2,902,091 | 9/1959 | Dahle . |
| 3,197,357 | 7/1965 | Schulpen . |
| 3,311,007 | 3/1967 | McGee . |
| 3,431,802 | 3/1969 | Schulpen . |
| 3,690,203 | 9/1972 | Huttemann . |
| 3,695,128 | 10/1972 | Gentile . |
| 3,730,031 | 5/1973 | Huttemann . |
| 3,828,378 | 8/1974 | Flam ............................ 5/464 |
| 4,042,987 | 8/1977 | Rogers ........................... 5/464 |
| 4,351,211 | 9/1982 | Azzolini . |
| 4,392,489 | 7/1983 | Wagner, Sr. . |
| 4,550,547 | 11/1985 | Wagner, Sr. . |
| 4,603,445 | 8/1986 | Spann ........................... 5/481 |
| 4,620,337 | 11/1986 | Williams et al. . |
| 4,672,700 | 6/1987 | Poncy . |
| 4,679,266 | 7/1987 | Kraft . |
| 4,700,447 | 10/1987 | Spann . |
| 4,768,251 | 9/1988 | Baskent ........................ 5/464 |
| 4,862,538 | 9/1989 | Spann et al. .................. 5/464 |
| 4,879,776 | 11/1989 | Farley ........................ 5/464 X |
| 4,901,387 | 2/1990 | Luke ............................ 5/464 |

FOREIGN PATENT DOCUMENTS 1559851  1/1980  United Kingdom ............... 5/464

OTHER PUBLICATIONS

SpanAmerica Medical Systems Geo-Matt Brochure, pp. 1-4, 1986.
Biogard Critical Care Floatation Unit Flier, pp. 1-2; Feb. 1985.
Med. Foam Flier, p. 1, date unknown.
Two Official Gazette entries; Sep. 6, 1988.

Primary Examiner—Michael F. Trettel

[57] ABSTRACT

A convoluted foam pad for supporting a reclining human body on a bed including an area for supporting the shoulders of a body, an area for supporting the tail portion of a body and a general support area surrounding the shoulder and tail support areas for supporting the remainder of the body. In one embodiment the support area is formed by peaks arranged in rows, wherein each peak has a flat top and is spaced from any adjacent peak in the same row by a valley. The average valley thickness of the valleys in both the shoulder support area and the tail support area are less than the average valley thickness of the valleys in the general support area. In another embodiment, the shoulder and tail support areas are formed by parallel ribs separated and bounded by areas comprising flat-topped peaks and valleys. Another aspect of the invention is a method of manufacturing convoluted foam pads including compressing a foam block between two rollers having radially extended fingers of varying effective heights, cutting the compressed block into halves having varying peak heights and valleys having varying valley floor heights, and cutting the tops of the peaks off the create areas having lower volumes of foam than other areas.

13 Claims, 10 Drawing Sheets

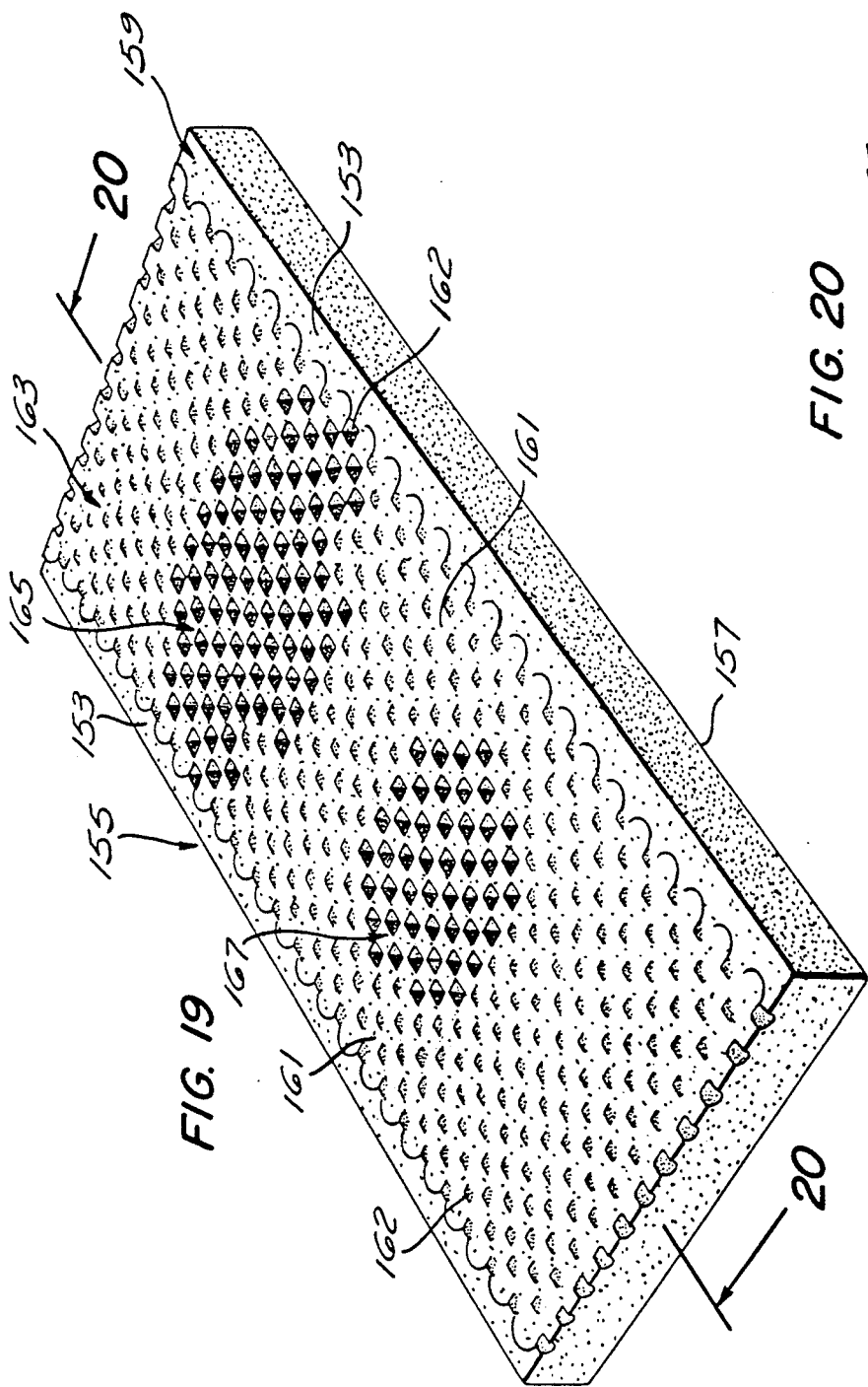
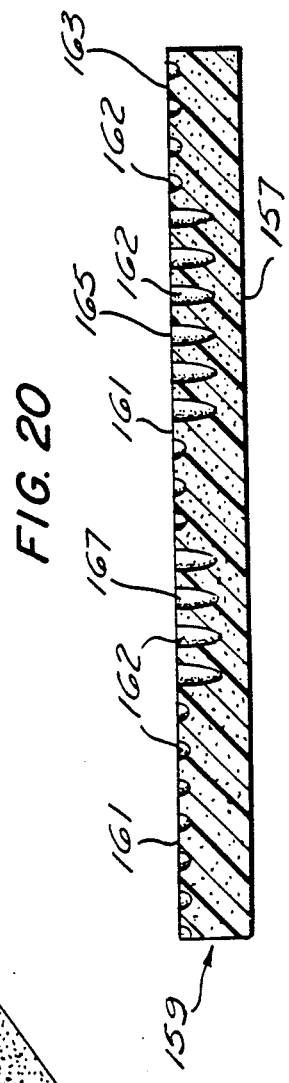
FIG. 19
FIG. 20

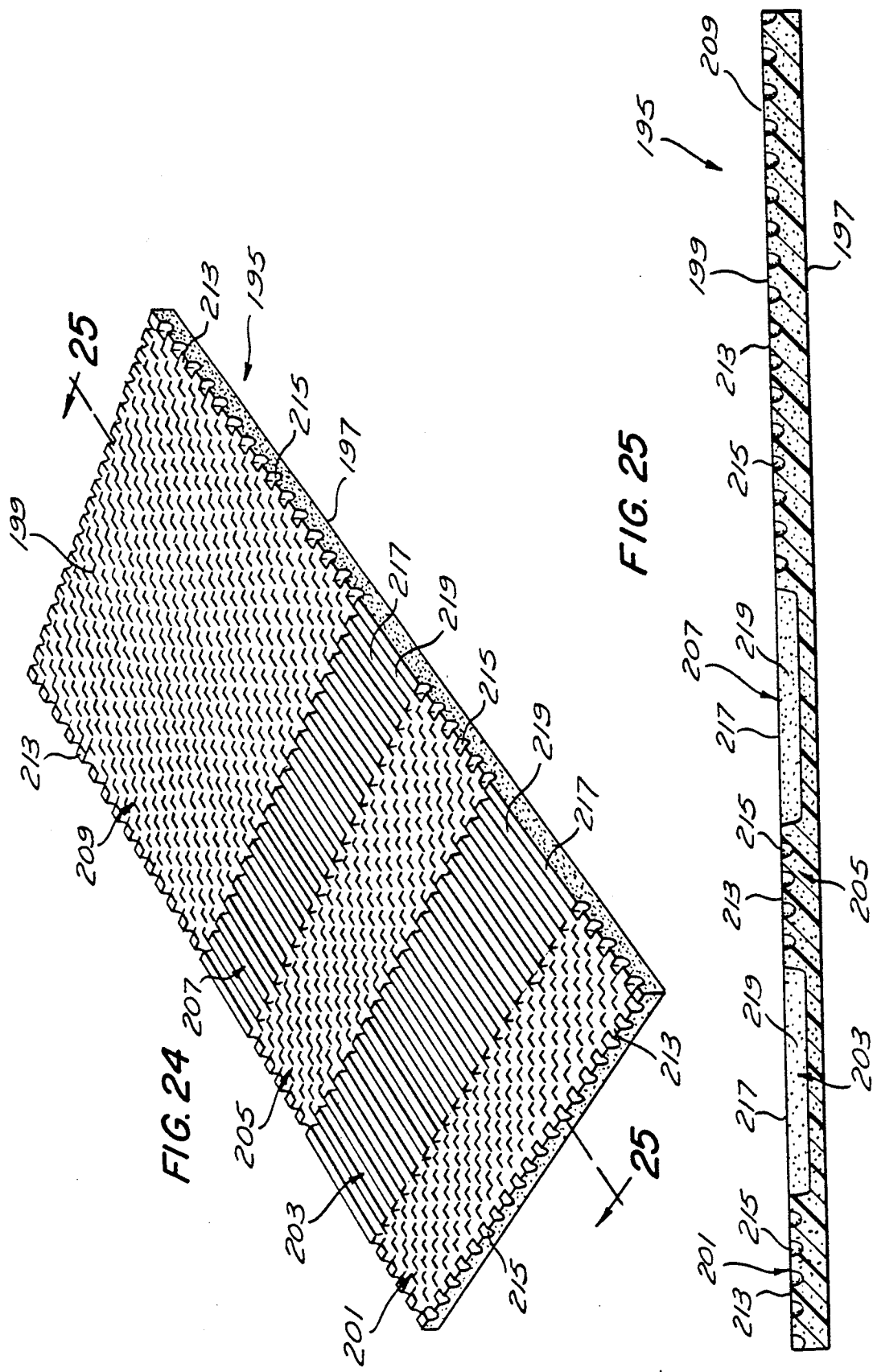

ANATOMICALLY CONFORMABLE FOAM SUPPORT PAD

BACKGROUND OF THE INVENTION

This invention relates to pads for supporting the seated and recumbent human body which redistribute body weight away from bony prominent areas, which areas are the most susceptible to the formation of pressure ulcers and, in particular, to convoluted foam pads used for this purpose.

Two of the primary causes of pressure ulcers are pressure and moisture. The pressure results from the supporting surface resisting the force of gravity on the body. For mattresses, this pressure is typically the highest beneath the shoulder (the scapulae) and tail (the sacrum and trochanter), generally the areas of greatest mass and projection. In these high pressure areas, the pressure against the body can be sufficient to occlude the capillaries and lymph vessels, thereby preventing the circulation of oxygen and nutrients to the skin. In addition, because airflow over these skin areas is typically prevented due to the surface of the mattress, greater amounts of moisture are excreted for the dissipation of heat and waste. Over a sufficient period of time, the combination of high pressure and moisture will lead to the formation of pressure ulcers.

In an effort to combat the formation of pressure ulcers among patients, hospitals utilize a number of types of bed pads for their patients who fall into high risk categories. These products include static air, water and foam support pads. Although these pads cannot reduce the overall resistance of the mattress to the weight of the body, they can reduce the level of pressure on the areas of highest pressure by redistributing the load and allowing a greater portion of the pad to support the body. Each of these types of pads has different advantages and disadvantages.

Generally, static air and water support pads provide superior high pressure reduction capabilities at the bony prominences, but permit only limited air flow and heat dissipation. In addition, both static air and water support pads require filling, are susceptible to leaks and tend to "bottom out" (i.e., permit the weight of the user to displace the air or water in the pad to the extent that the user is supported by the mattress, rather than by the air or water cushion). Static water support pads also are undesirable in that they are heavy and unwieldy to transport. While pumps and valves can be used to vary the pressure resistance of the static air and water pads over time, these features render the pad both expensive and difficult to install and transport.

Convoluted foam pads, on the other hand, are generally relatively inexpensive and easily transported, while providing superior air flow potential and moisture reduction capabilities. Unfortunately, despite considerable study and effort, it has proved exceedingly difficult to develop an easily manufactured convoluted foam pad which is capable of providing pressure reduction characteristics comparable to static air and water support pads.

The manufacture of convoluted foam pads continues to largely follow the methods taught by U.S. Pat. No. 3,431,802, which patent is hereby incorporated by reference. The pads are typically formed by feeding a foam block between two cooperating parallel cylinders, each of which has undulated surface. The cylinders rotate towards one another and are spaced so that the block inserted between them is compressed between the cylinders and is driven against a cutting edge which slices the block in half. Each half generally comprises alternating rows of peaks and valleys, in checkerboard fashion. The resulting halves are perfectly matched so that when one half is laid upon the other, the tops of the peaks of one half rest against the floor of the valleys of the other half forming a solid block. In addition, although it is possible to manufacture pads which are not the mirror image or reflection of one another, this is rarely done, as it would typically result in only one usable half, thereby significantly increasing material costs.

One convoluted foam pad currently in use is disclosed in U.S. Pat. No. 4,686,724. The pad is comprises alternating columns of peaks and valleys in checkerboard fashion. Air channels are stamped, press cut or laser cut through the floor of the valleys to the bottom face of the pad, leaving removable plugs used to selectively control the amount of aeration and dissipation of body heat permitted by the pad.

In one embodiment, the peaks of the pad are "topped off" to create a broken flat surface, interposed with valleys, with the distance between the floor of each valley and the bottom surface of the pad being constant. Within each valley is a channel extending from the valley floor to the flat bottom face of the pad. The patent teaches that a skin area of 1.25 inches in diameter or less, even though denied air circulation, can sustain itself from air circulating in an adjacent area. Therefore, by limiting each peak top to a diameter of 1.25 inches or less, the occurrence of decubitus ulcers can, according to the patent, be virtually eliminated. Unfortunately, the use of this uniform pad with its removable plugs has found little acceptance in practice, perhaps because the removal and replacement of the individual plugs is relatively difficult and time consuming.

A second convoluted foam pad is disclosed in U.S. Pat. No. 4,620,337. The pad is designed to prevent the formation of decubitus ulcers by minimizing the amount of pressure exerted on the body. The pad has three distinct sections: a convoluted head supporting section; a ribbed torso supporting section; and a convoluted foot and leg supporting section. As with most foam pads which are manufactured from a block of uniform thickness, the sum of the distance from the bottom face of the pad to the top of any peak (the "peak height") and the distance from the bottom face of the pad to the floor of any valley (the "base height" or "valley floor height") remains constant. This arises from the fact that although the height of the undulating surface of the paired cylinders varies along their length, the opposing undulating surfaces are of an equal height.

The pad is designed on the premise that heavier portions of the body are less likely to develop pressure ulcers when they are supported by a portion of the pad with a lower peak to base ratio, and that lighter portions of the body are less likely to develop pressure ulcers when they are supported by a portion of the pad with a higher peak to base ratio. Accordingly, the ribs of the torso supporting section are shorter than the average height of the peaks of the head or leg supporting sections, and the floors of the valleys of the torso supporting section are higher than the average height of the floors of the valleys of the head or leg supporting sections. Unfortunately, however, the pressure reduction capabilities of this pad are significantly lower than the pressure reduction capabilities of static air or water support pads.

What is needed, therefore, is a convoluted foam pad which is easy to manufacture and provides high pressure area reduction capabilities comparable to the static air and water support pads.

SUMMARY OF THE INVENTION

The present invention solves these problems by providing an easily manufactured convoluted foam pad having pressure redistribution capabilities comparable to the static air and water support pads and a method of manufacturing the same.

One embodiment of the invention is a convoluted foam pad for supporting at least part of a human body having a solid flat lower face and a flat upper surface wherein at least one area of the pad provides less resistance to the weight of the body than other areas of the pad. Desirably, the area providing this decreased resistance corresponds to a protruding portion of the body, thereby allowing the body to sink farther into the pad.

Another embodiment of the invention is an elongate convoluted foam pad for supporting a reclining human body on a bed. The pad includes an area for supporting the shoulders of a body, an area for supporting the tail portion of the body and a general support area surrounding the shoulder and tail support areas for supporting the remainder of the body. Each support area is formed by flat-topped peaks arranged in rows, wherein each peak in the same row is spaced from any adjacent peak by a valley.

To decrease the average pressure levels on the shoulder and tail portions of the body, the average valley thickness (i.e., the average vertical distance between the valley floors and the bottom of the portion of the pad directly beneath the respective valley floors) of the valleys in both the shoulder support area and the tail support area are less than the average valley thickness of the valleys in the general support area. This diminished valley thickness has the dual effect of reducing the resistance of the pad to the weight of the tail and shoulder portions of the body and permitting the tail and shoulder areas of the body to sink farther into the pad. The increased deformation of the pad is significant in that, as the tail and shoulders of the body sink further into the pad, the middle back and extremities exert greater pressure against the general support area of the pad. In addition, the farther the tail and shoulder portions of the body sink into the pad, the greater the amount of total surface area of the pad in contact with the tail and shoulders portions of the body, resulting in a decrease in the average amount of resistance pressure exerted by the pad per square inch in these critical areas.

Desirably, the pad has a flat upper face formed by the flat tops of the peaks of the pad which all lie substantially in a single plane and a solid flat lower face, without holes or cavities. The pad is desirably made from an open cell expanded plastic polyurethane foam with a density of between 1-3 pounds per cubic foot, and has a peak thickness of one inch or greater.

Another aspect of the invention is a method of manufacturing convoluted foam pads. The method includes compressing a foam block between two rollers having radially extended fingers of varying effective heights. The compressed block is then cut into two halves to form peaks and valleys. As a result of the varying effective heights of the fingers of the rollers, the peaks will have varying peak heights and the valleys will have varying valley floor heights. The tops of the peaks are then cut off to create areas having lower volumes of foam than other areas. These low foam volume areas will tend to provide less resistance to pressure than the areas of the pad having a higher volume of foam.

Desirably, the tops of the peaks are cut so the top of each peak will be in substantially the same plane. Where some of the corners of the peaks are connected by webbing, the method may also include the separating some of the peaks connected by webbing to decrease the resistance of the locale including the separated peaks to pressure.

BRIEF DESCRIPTION OF THE DRAWINGS

These and other features of the invention will now be described with reference to drawings for preferred embodiment which is intended to illustrate, and not to limit, the invention and in which:

FIG. 19 is a perspective view of one of the halves of FIG. 18 after being saw-cut;

FIG. 20 is a sectional view taken along line 20—20 of FIG. 19 illustrating the varying valley thicknesses of the different areas of the mattress;

FIG. 24 is a perspective view of one of the halves of FIG. 23 after being saw-cut; and FIG. 25 is a sectional view taken along line 25—25 of FIG. 24 illustrating the varying valley thicknesses of the different areas of the pad.

DETAILED DESCRIPTION OF THE PREFERRED EMBODIMENT

Figure 1:
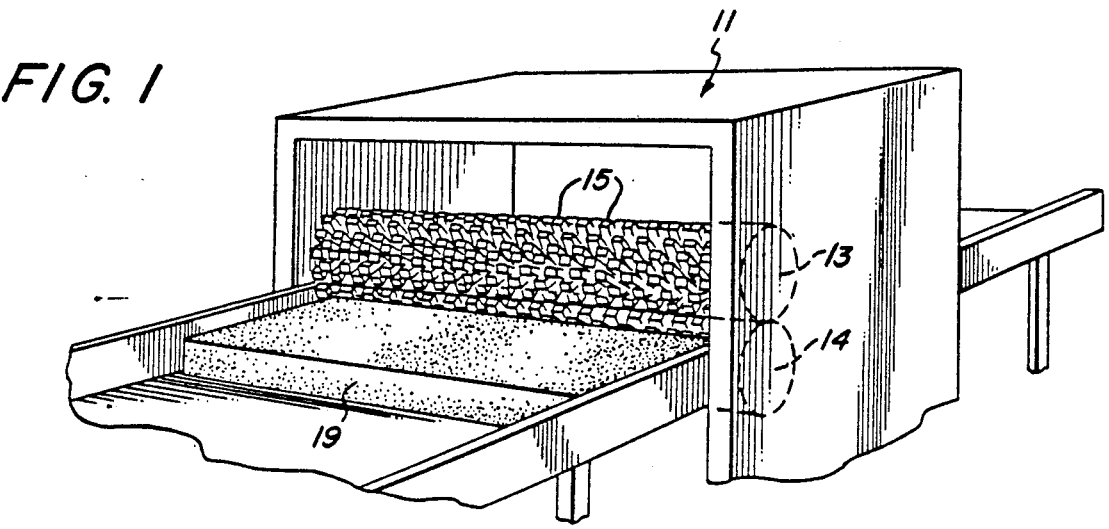
FIG. 1 is a perspective view illustrating a foam block being inserted between a pair of cylindrical rollers.

FIG. 1 shows an apparatus 11 for manufacturing convoluted foam pads. The apparatus 11 includes a pair of cooperating parallel rollers, 13 and 14, each of which has a cylindrical body and an undulated surface. As more clearly shown in FIG. 2, the undulated surface of each roller is formed by a plurality of fingers 15 of generally rectangular cross section extending radially from its cylindrical body. Naturally, if desired, another shape of finger could be utilized. The fingers 15 are arranged in vertical and horizontal rows. Fingers in vertically adjacent rows are staggered vertically a circumferential distance approximately equal to the vertical width of the fingers. Fingers in horizontally adjacent rows are staggered horizontally a circumferential distance approximately equal to the horizontal width of the fingers.

Figure 4:
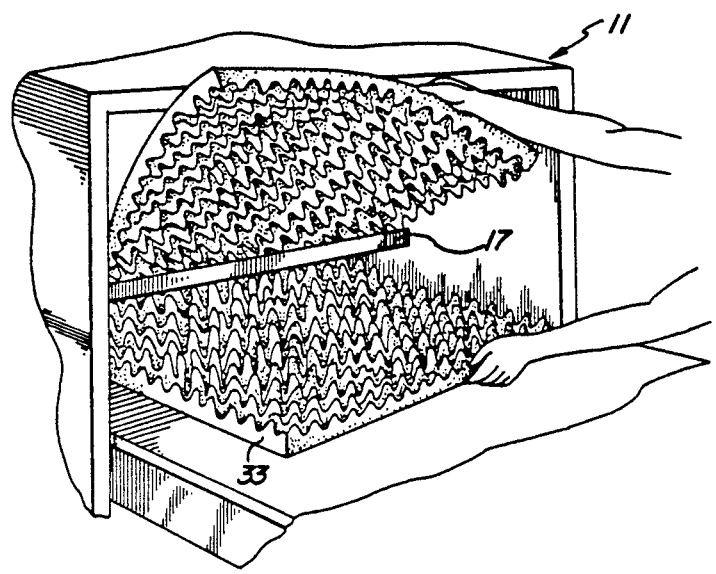
FIG. 4 is an illustration of two convoluted halves of a block after insertion into the apparatus of FIG. 1.

The rotating rollers, 13 and 14, compress and drive the foam block 19 against a cutter (a guard 17 for which is shown in FIG. 4). As shown in FIG. 1, the upper roller rotates counterclockwise and the lower rotates clockwise. This rotation is synchronized so the fingers 15 of the respective rollers are opposed by the spaces 21 between the fingers of the opposite roller, rather than directly by its fingers 15. In addition, to obtain pads which are virtually a mirror image of one another, all fingers 15 on a given side of, and vertically adjacent to, the spaces of one roller have an effective height equal to the effective height of the finger of the opposing roller which opposes the space.

Figure 2:
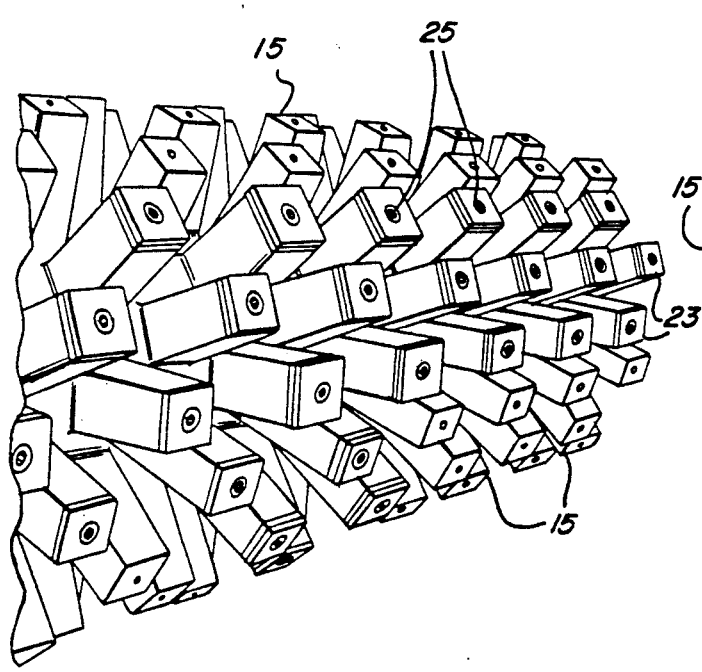
FIG. 2 is an enlarged partial perspective view illustrating the fingers of the rollers of FIG. 1.
Figure 3:
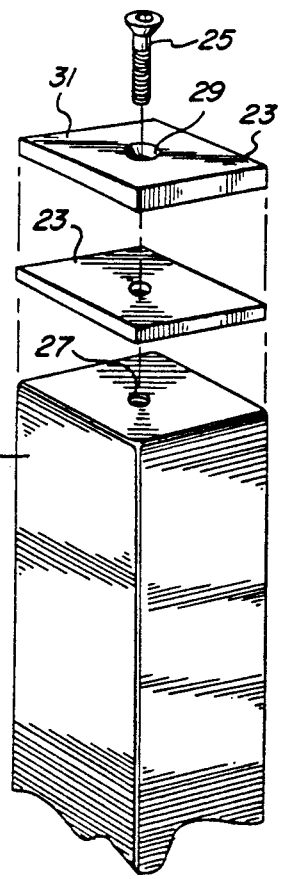
FIG. 3 is an enlarged exploded perspective view of one of the fingers of FIG. 2.

As best seen in FIGS. 2 and 3, the radial height of each of the fingers 15 is equal. Selected fingers, however, have a greater effective radial height as a result of one or more flat rectangular caps 23 or plates being secured to the radial outer end of the finger by a bolt 25 threadably secured within a tapped bore 27 extending radially through the center of the finger. Naturally, the thickness of the caps 23 can be varied depending upon the given application. A countersink 29 may be provided around the bore 27 of the outer cap, so that the head of the bolt 25 is flush with the outer face 31 of the cap.

Figure 5:
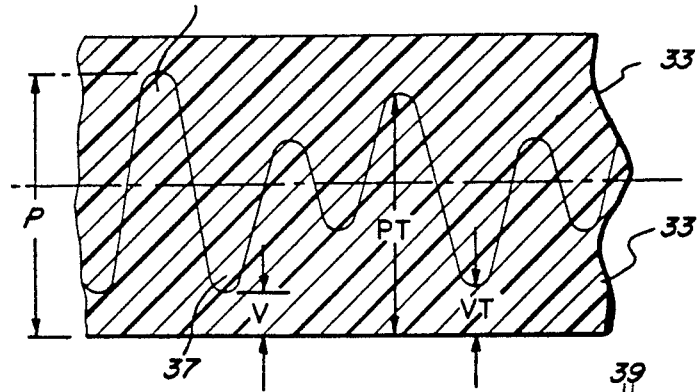
FIG. 5 illustrates the fit between the halves of the block of FIG. 4.

Referring to FIG. 4, after the foam block 19 is compressed between the rollers, it is driven against the cutter (not shown) which slices the block 19 into halves 33. As shown in FIG. 5, the resulting halves 33 are virtually a perfect mirror image of one another, with each peak 35 of one half corresponding to an adjacent peak 37 of equal size on the other half. On the other hand, the variance in the effective height of the fingers 15 results both in peaks with varying peak heights P, and valleys with varying valley floor heights V. Because the pad is cut from a single block 19, however, the sum of the valley floor height and the corresponding peak height will equal a constant, so long as the block being cut is of uniform thickness.

By varying the effective height of the fingers less than one quarter of an inch, the heights of the peaks 42 of the resulting foam halves 33 can be varied 3-4 inches. Naturally, since the block halves 33 are a mirror image of one another, the base height of the corresponding valleys 44 will vary an equal amount. Thus, although the peak to base ratio of the pad can be made to vary widely, essentially the same volume of foam is present to resist the weight of a given area of the body supported by the pad.

Figure 6:
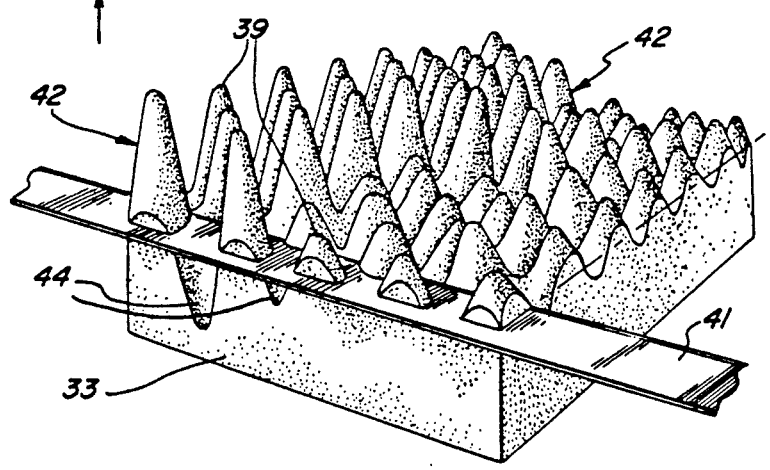
FIG. 6 illustrates the topping-off of the peaks of one of the halves of FIG. 4.
Figure 7:
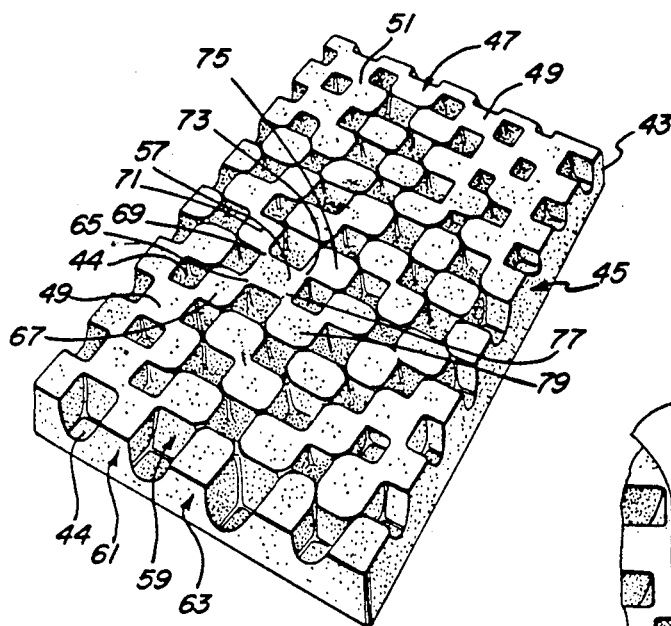
FIG. 7 illustrates the half of FIG. 6 after being saw cut.

As shown in FIG. 6, the tops 39 of the peaks 42 are then removed with a band saw 41 or other suitable cutting device, thereby leaving a rectangular pad 43 with a flat solid lower face 45 and a substantially flat upper face 47 comprised of the flat tops 49 of the peaks 42. As shown in FIG. 7, the pad 43 comprises adjacent rows of peaks 42 of generally rectangular cross section, each of which are separated by valleys 44, also of generally rectangular cross section. Since the peaks 42 in adjacent rows are staggered, the overall effect is a checkerboard pattern, with the corners of the peaks 42 in adjacent rows connected by webbing 51 extending between the peaks 42 to the floor of the valleys 44. The webbing 51 between some peaks 42 will extend from the top of the peak downward to the floor of the valley between them. Between other peaks 42, especially those with lower valley heights, the webbing 51 will be spaced below the tops of the peaks 42 and extend downward to the floor of the valley between them. For example, referring to FIG. 7, a peak 57, in a row of peaks 59 between a second and third row of peaks, 61 and 63, respectively, has a first corner 65 connected by webbing 51 to a corner of a first peak 67 in the second row 61 and a second corner 69 which is connected by webbing 51 to a corner of a second peak 71 in the second row 61. Likewise, the peak 57 has a third corner 73 which is connected by webbing 51 to a corner of a first peak 75 in the third row 63 and a fourth corner 77 which is connected by webbing 51 to a second peak 79 in the third row 63.

To obtain two generally uniform pads from a single block 19 it is desirable that the tops of the peaks 42 are cut off at a point midway between the tops of the peaks 42 and the floor of the valleys 44. Although each of the remaining flat-topped peaks 42 will have a uniform peak height, the base height of the valley floors varies in proportion to the effective height of the finger which created it. Since the pad 43 has a flat lower face 45, the peak height of each peak is equal to its peak thickness (i.e., the vertical distance between the top of the peak and the bottom of the portion of the pad 43 directly beneath the peak). Naturally, if the lower face of the pad 43 included an opening beneath the peak, this would not be the case. Likewise, the valley floor height of each valley of the illustrated pad 43 is equal to its valley thickness (i.e., the vertical distance between the valley floor and the bottom of the portion of the pad 43 directly beneath the valley floor). If the lower face 45 of the pad 43 included an opening beneath the valley floor, however, this would not be the case.

By increasing the effective height of the fingers 15 which correspond to the areas of the pad 43 supporting the shoulder and tail portions of the body, taller peaks 42 and lower valleys 44 are formed in those areas of the pad 43. By evening out the heights of the peaks 42 by topping them off at a certain height, one is left with a smaller volume of foam to resist the weight of the that portion of the body. It has been found that the smaller the volume of foam in a given area, the smaller the level of resistance of the foam to the weight of the body will be. By decreasing the volume of foam beneath these heavier portions of the body, the more the weight of the body portions to overcome the resistance of the pad and sink into the foam. This, in turn, increases the surface area of the pad in contact with the body portion, thereby further diminishing the level of pressure exerted on the skin of the body per unit area. In addition, since both the shoulder and tail portion of the body protrude farther than the lighter portions, as the shoulder and tail portions sink into the pad, the pressure of the pad on the less protruding portions (e.g., the middle of the back) will increase, thereby relieving pressure from the tail and shoulder portions of the body.

The pad of the present invention can be made from a wide variety of types of foam of varying density and thickness. It has been found, however, that the desired combination of cushioning and support is obtained from an open cell expanded plastic polyurethane foam with a density of between one and three pounds per cubic foot, preferably 1.5 pounds. The peak and valley thickness of the pad 43 is desirably sufficient to ensure that the body supported by the pad does not bottom out. For a bed pad 43 having a density of between 1-3 pounds, a peak thickness of between 3-5 inches, and a valley thickness of approximately one half of an inch has been found to be sufficient to prevent bottoming out in most instances. In home health care applications, however, significant benefits can be realized from a pad with a peak thickness as low as one inch and a valley thickness as low as one-eighth of an inch, which imposes a concavity to the bed surface for comfort, as opposed to therapeutic purposes.

Figure 8:
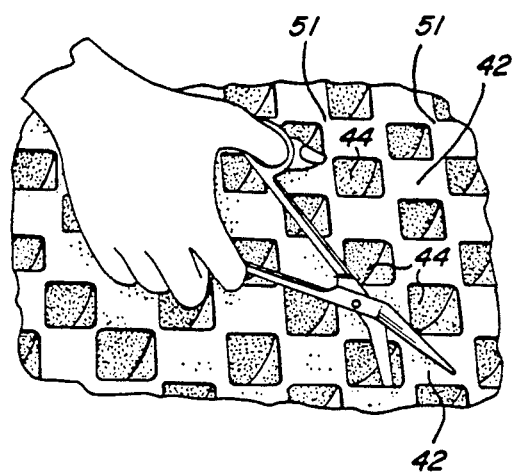
FIG. 8 illustrates the clip cutting of the half of FIG. 7.

At times, in addition to the standardized pressure reduction capabilities of the pad 43, it is desirable in the case of burns or other localized injury to decrease the level of pressure resistance in a given area of the pad. As illustrated in FIG. 8 this may be accomplished by cutting the webbing 51 connecting the corners of the peaks 42 in adjacent rows to separate the peaks 42. This has the effect of decreasing the "hammock effect" between the separated peaks. The hammock effect results from neighboring peaks resisting the tendency of a connected peak to be compressed below their level, much like two trees resist the tendency of a hammock to sag to the ground in response to the weight on the hammock. The cutting of the webbing 51 largely eliminates this effect, thereby decreasing the capacity of the locale which includes the separated peak to resist the weight of a body.

Figure 9:
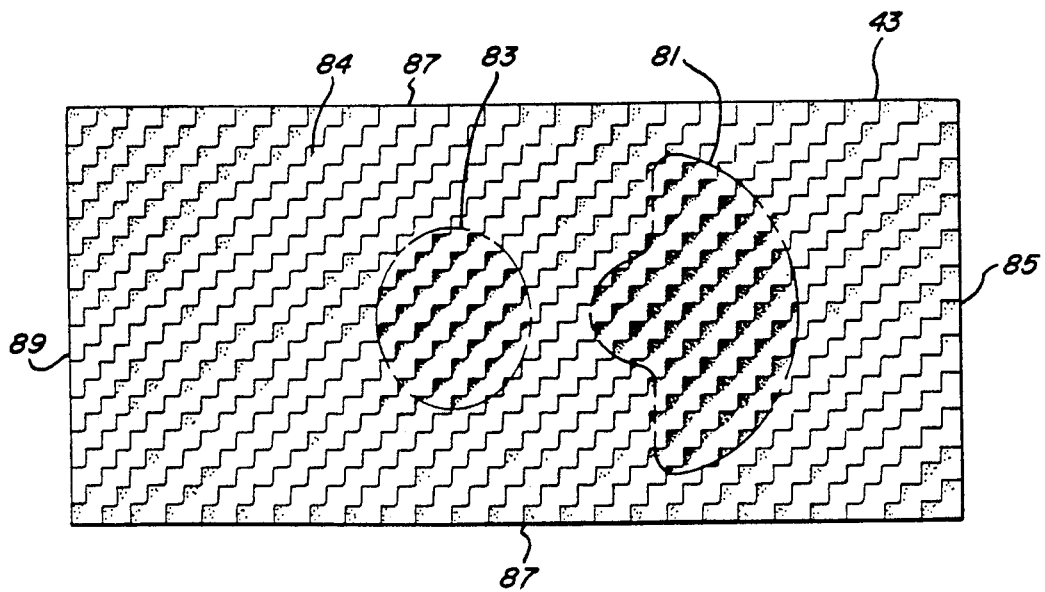
FIG. 9 is a schematic plan view illustrating the general spacing of the tail and shoulder regions of a bed pad made in accordance with the principles of the present invention.
Figure 14:
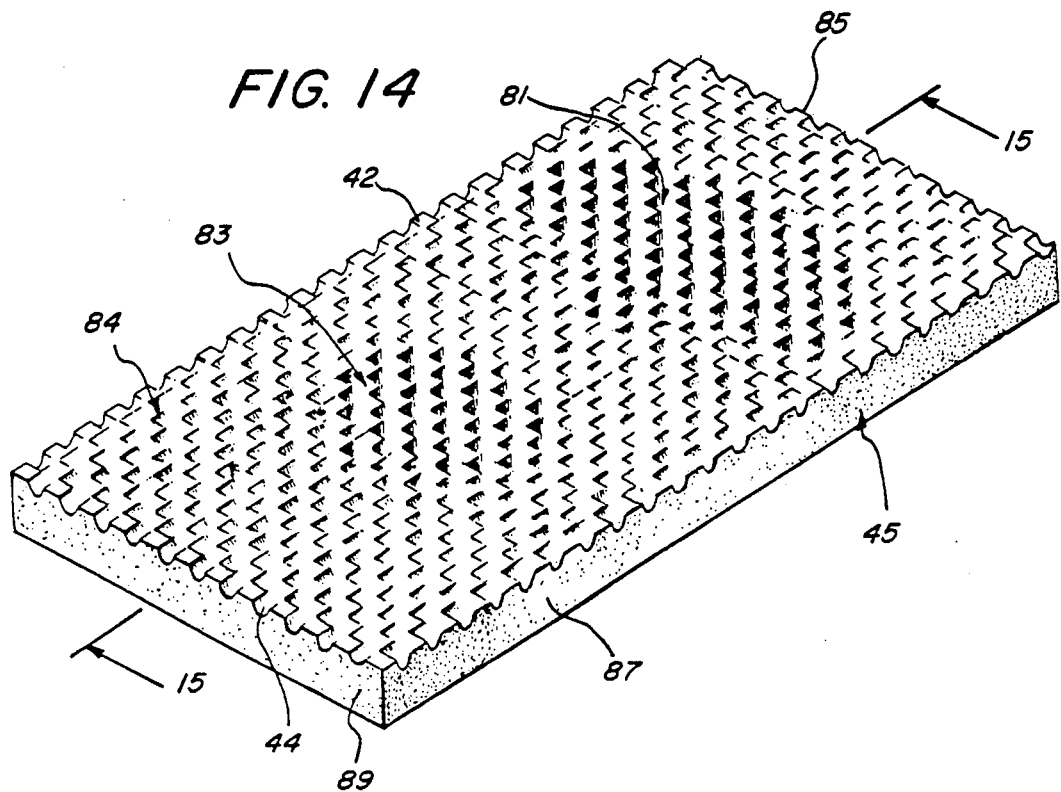
FIG. 14 is a perspective view of the bed of FIG. 9.

Referring to FIG. 9, there is shown a schematic view of a bed pad 43 manufactured in accordance with the principles of the present invention. As further shown in FIGS. 14, the bed pad 43 will generally have an overall length of between 60-90 inches and a width of between 25-40 inches, depending upon the length and width of the mattress being covered. For specialty beds, the length could vary between 30-90 inches and the width could vary between 20-90 inches. The illustrated pad 43 has a length of approximately 72 inches and a width of approximately 35 inches. The shoulder support area 81 and tail support area 83 of the pad 43 are positioned to correspond to the normal position of the shoulder and tail portions of the body of the intended user and are surrounded by the general support area 84 of the pad 43.

The shoulder support area 81 of the illustrated pad 43 is spaced twelve inches from one end 85 of the pad, is centered between the sides 87 of the pad and has a width of 28.35 inches and a length of 14.85 inches. The width and length of the shoulder support area 81, as well as its shape may vary, but preferably the width is between 25 and 33 inches, the length is between 12 and 17 inches and the shape is generally that of a mushroom. There is a gap of 6 inches between the shoulder and tail support areas of the pad 43. The tail support area 83 of the illustrated pad 43 is elliptical in shape, is centered between the sides of the pad, has a width of 17.55 inches and a length of 12.15 inches. This spaces the tail support area 27 inches from the other end 89 of the pad. As with the shoulder support area 81, the width and length of the tail support area 83, as well as its shape, may vary, but preferably, the width is between 15 and 20 inches, the length is between 10 and 17 inches, and the area is generally elliptical or circular in shape. Naturally, an additional support area could be added for the heels, if desired.

Figure 15:
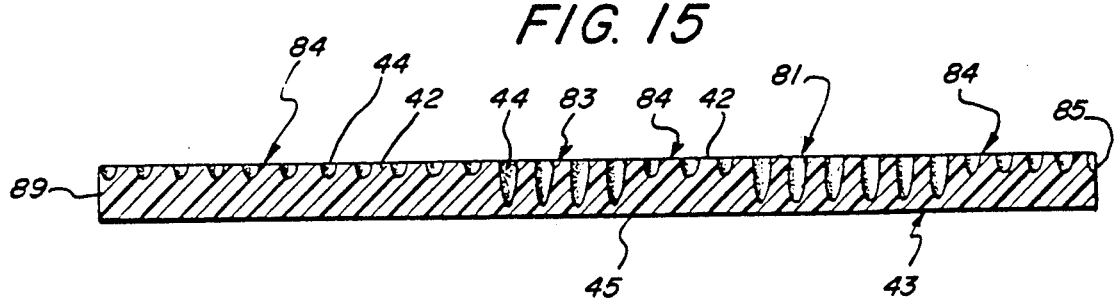
FIG. 15 is a sectional view taken along line 15—15 of FIG. 14 illustrating the varying valley thicknesses of the different areas of the bed pad.

Although the sizes of the peaks 42 and valleys 44 of the pad 43 may be varied, the illustrated pad has a uniform distribution of peaks of square cross section. The peaks 42 of the general support area, the shoulder support area 81 and the tail support area 83 all have a peak thickness of 4 inches and a square cross section with a width of 1.35 inches. As best seen in FIG. 15, to provide the desired lowered resistance and body contouring features, the valley thicknesses of the shoulder and tail support sections of the pad are less than the valley thicknesses of the general support area of the pad. Specifically, the valley thickness for both the shoulder support area 81 and the tail support area 83 is one half of one inch, while the valley thickness for the general support area is 3 inches.

Advantageously, the bed pad 43 is formed by means of inserting a block 19 of foam lengthwise through a roller having a circumference equal to the length of the bed pad 43, so that a pair of pads is formed by a single turn of the roller. Thus, the illustrated pad 43 would be formed with two rollers each having a circumference of 72 inches. The fingers 15 of each roller corresponding to the general support area of the pad 43 advantageously extend radially 2.5 inches from the cylindrical core of the roller and have a square cross section with a width of 0.9 inches. This width may vary, but is preferably between 1.25 and 2.0 inches. The space between the opposing rollers, 13 and 14, is roughly one quarter of an inch, with this distance being shortened where the rollers are provided with caps. The fingers 15 of the roller corresponding to the shoulder support area 81 and the tail support area 83 are advantageously formed by fingers 15 with an effective finger height of 2.6875 inches, resulting from the placing of caps 23 having a combined thickness of 3/16 of an inch onto the end of the fingers 15. The resulting bed pad 43 is 4 inches thick with a valley thickness of 0.5 inches which is sufficient to prevent bottoming out in most cases.

In a test comparing a bed pad, generally conforming to the specifications set forth above, with static water, static air and other convoluted foam support pads, the bed pad of the present invention not only demonstrated pressure relief capabilities, in the scapulae, sacrum and trochanter areas, superior to the other convoluted foam bed pads tested, but demonstrated pressure redistribution capabilities in these areas comparable to the static air and water support pads tested. Specifically, the pads tested are as follows:

| Designation | Manufacturer | Trademark | Model No. | Type |
|---|---|---|---|---|
| Foam #1* | Pre-Foam, Inc. | HIGHFLOAT | 5095020 | foam |
| Water | Lotus Healthcare Products | LOTUS | HM3666 | water |
| Air | Gaymar Industries, Inc. | SOF.CARE | SC-402 | air |
| Foam #2 | Bio Clinic Company | BIOGARD | 669030 | foam |
| Foam #3 | Span America Medical Systems, Inc. | GEO-MATT | 50960-581 | foam |
| Foam #4 | Pre-Foam, Inc. | PREVENT | P141 | foam |

*Foam Pad #1 is a pad made in accordance with the principles of the present invention.

A summary of the test results are set forth below in the following table:

| Pad Designation | Pressure Level | | |
|---|---|---|---|
| | Scapulae (mm Hg) | Sacrum (mm Hg) | Trochanter (mm Hg) |
| Foam #1* | 24.02 | 28.28 | 44.22 |
| Water | 22.44 | 25.96 | 46.74 |
| Air | 32.36 | 33.15 | 40.57 |
| Foam #2 | 29.26 | 34.40 | 47.17 |
| Foam #3 | 23.04 | 31.97 | 49.73 |
| Foam #4 | 28.04 | 36.88 | 45.97 |

Thus, there is provided a convoluted foam bed pad which is both simple and inexpensive to manufacture and which provides high pressure redistribution capabilities comparable to static air and water support pads.

The method and teachings of the present invention can be used to manufacture pads of a wide variety of shapes and sizes. Specifically, the method of the present invention can be used to manufacture pillows and wheelchair pads which conform to the shape of the body, thereby increasing the total surface area of the pad resisting the body weight of the user.

Figure 10:
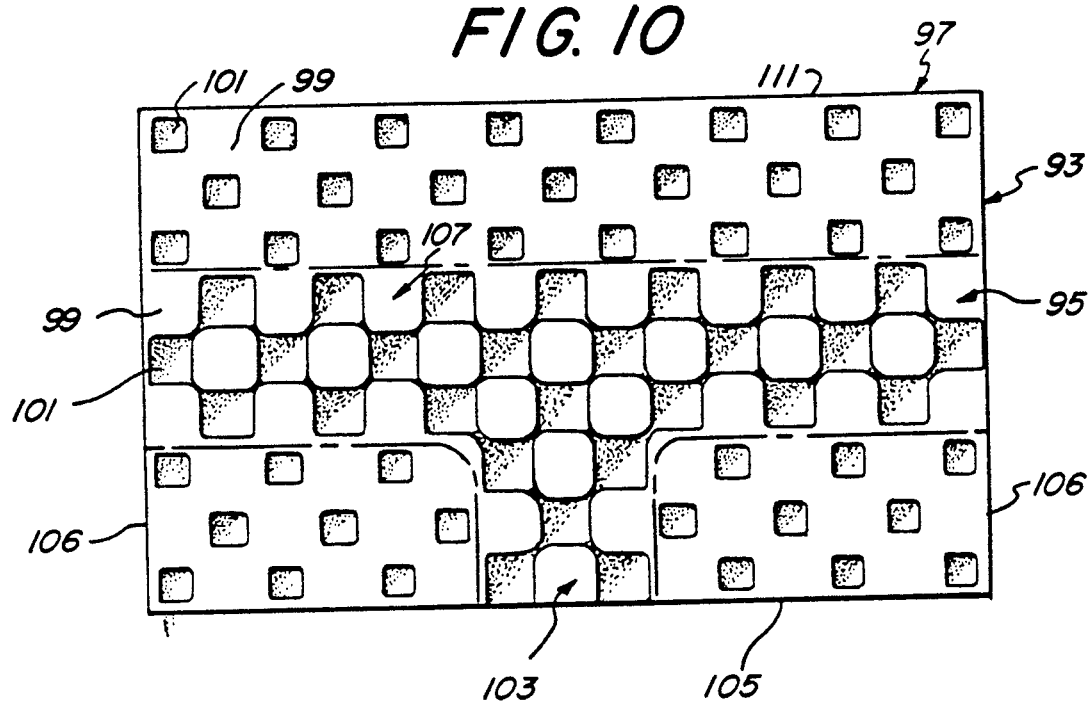
FIG. 10 is a schematic plan view of a pillow made in accordance with the principles of the present invention illustrating the shape of the head and neck support area in phantom.
Figure 12:
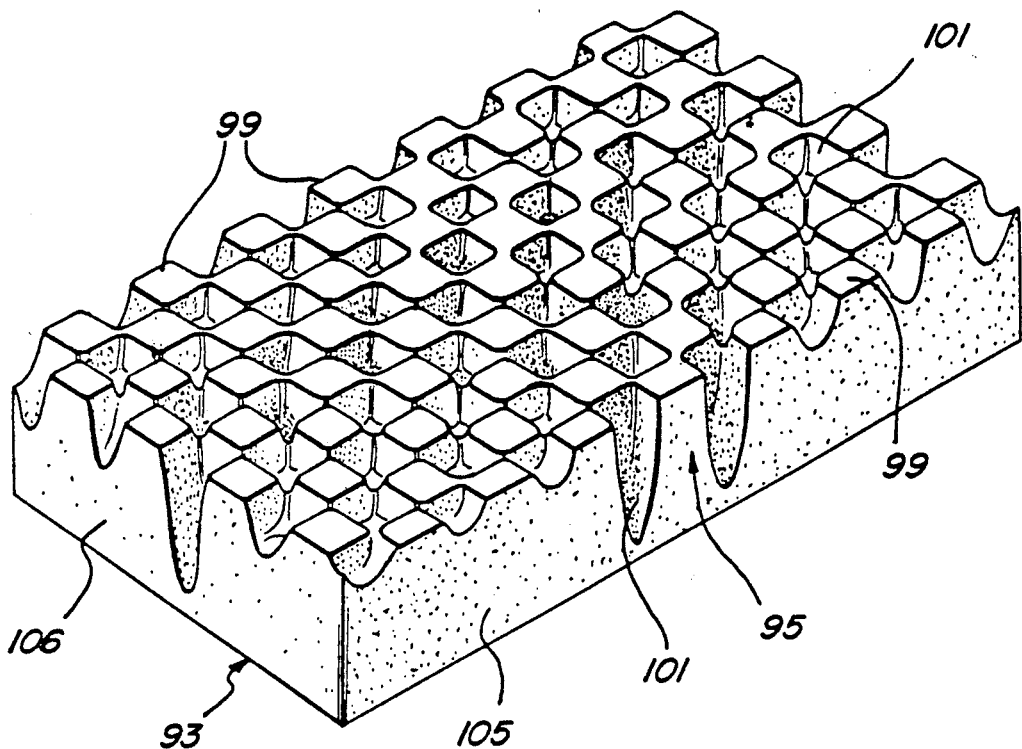
FIG. 12 is a perspective view of the pillow of FIG. 10.

FIGS. 10 and 12 show a pillow 93 having a generally T-shaped head and neck support area 95 and a general support area 97. As with the bed pad 43, the pillow 93 is formed by peaks 99 arranged in rows, wherein each peak has a flat top, is spaced from any adjacent peak in the same row by a valley 101 and has generally identical peak thicknesses. The tops of the peaks are all in substantially the same plane, thereby providing a pillow 93 of pleasing appearance which can be used with standard pillow covers. To increase the pillow's capacity to conform to the head and neck of the user, the average valley thickness of the head and neck support area 95 is less than the average valley thickness of the general support area 97. Although the dimensions of the pillow 93 can obviously be varied widely, depending upon the desired application, the illustrated pillow 93 has a width of 21 inches and a depth of 14 inches, with a uniform peak thickness of 4 inches. The truncated stem 103 of the T-shaped head and neck support area 95 extends toward the center of the pillow 93 from one end 105, is centered between the sides 106 of the pillow and has a width of 4.05 inches. The crossbar 107 of the T-shaped head and neck support area 95 extends from one side of the pillow to the other, is spaced 4.05 inches from the end of the pillow from which the stem portion extends, and has a depth of 4.05 inches. This spaces the stem portion 5.90 inches from the opposite end 111 of the pillow. The desired contouring effect may be obtained from a T-shaped head and neck support area 95 with an average valley thickness of ½ an inch and the general support area 97 with a uniform valley thickness of 3 inches.

Figure 11:
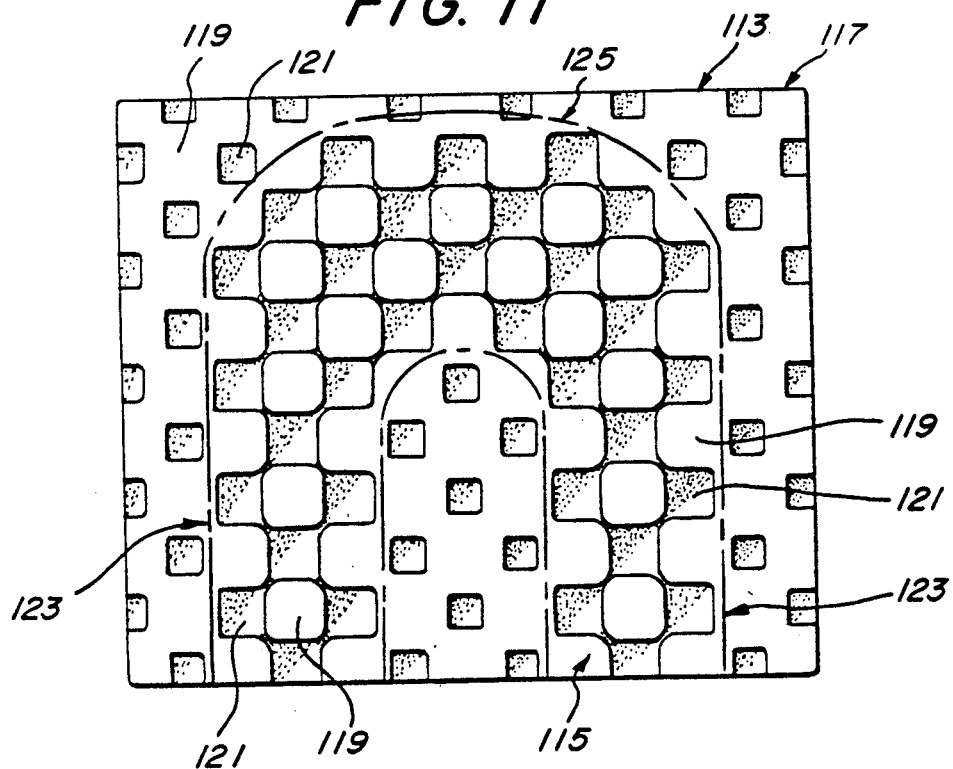
FIG. 11 is a schematic plan view of a wheelchair pad made in accordance with the principles of the present invention illustrating the shape of the buttock and thigh support area in phantom.
Figure 13:
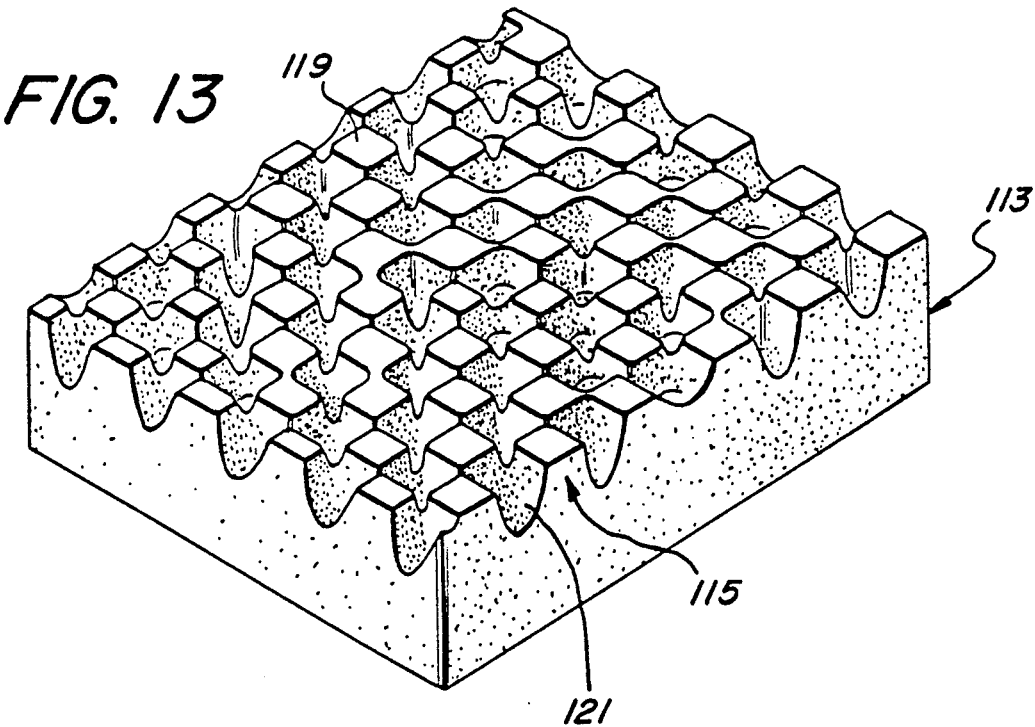
FIG. 13 is a perspective view of the wheelchair pad of FIG. 11.

FIGS. 11 and 13 show a wheelchair pad 113 having a generally U-shaped buttock and thigh support area 115 and a general support area 117. As with the pillow 93 and bed pad 43, the wheelchair pad 113 is formed by peaks 119 arranged in rows, wherein each peak has a flat top, is spaced from any adjacent peak in the same row by a valley 121 and has generally identical peak thickness. The tops of the peaks are also all in substantially the same plane, thereby providing a wheelchair pad 113 of pleasing appearance. To increase the wheelchair pad's capacity to conform to the buttocks and thighs of the user, the average valley thickness of the buttock and thigh support area 115 is less than the average valley thickness of the general support area 117. Although the dimensions of the wheelchair pad 113 can obviously be varied, depending upon the size of the chair and the user, the illustrated wheelchair pad 113 has a width of 18 inches and a depth of 16 inches, with a uniform peak thickness of 4½ inches. The legs 123 of the T-shaped buttock and thigh support area 115 extend toward the opposite end of the wheelchair pad from one end, are spaced 2.295 inches from the sides of the wheelchair pad and have a width of 4.05 inches. An arcuate connecting portion 125 connects the two legs of the U-shaped buttock and thigh support area 115, is spaced 1¼ inches from the opposite end of the wheelchair pad, and has a width of 4.05 inches. The desired contouring effect may be obtained from a U-shaped buttock and thigh support area 115 with an average valley thickness of ¾ inches and the general support area 117 with a uniform valley thickness of 3½ inches.

As illustrated in FIGS. 16–20, the method and teachings of the present invention can be used to manufacture an anatomically, conformable convoluted foam pad, particularly adapted to be used as a mattress, rather than a mattress overlay.

Figure 16:
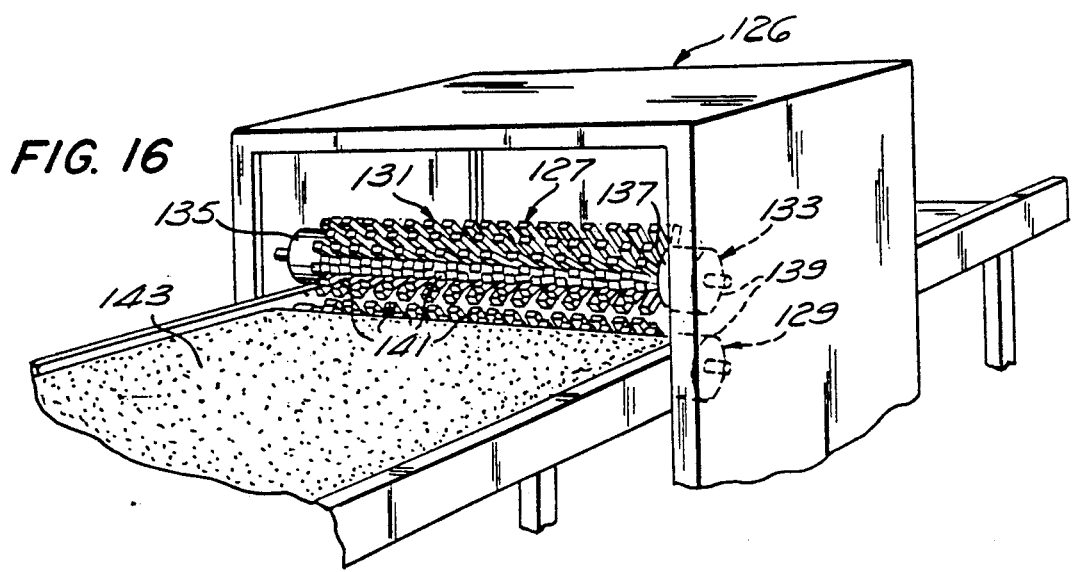
FIG. 16 is a perspective view illustrating a foam block being inserted between a pair of cylindrical rollers of an alternative configuration.
Figure 17:
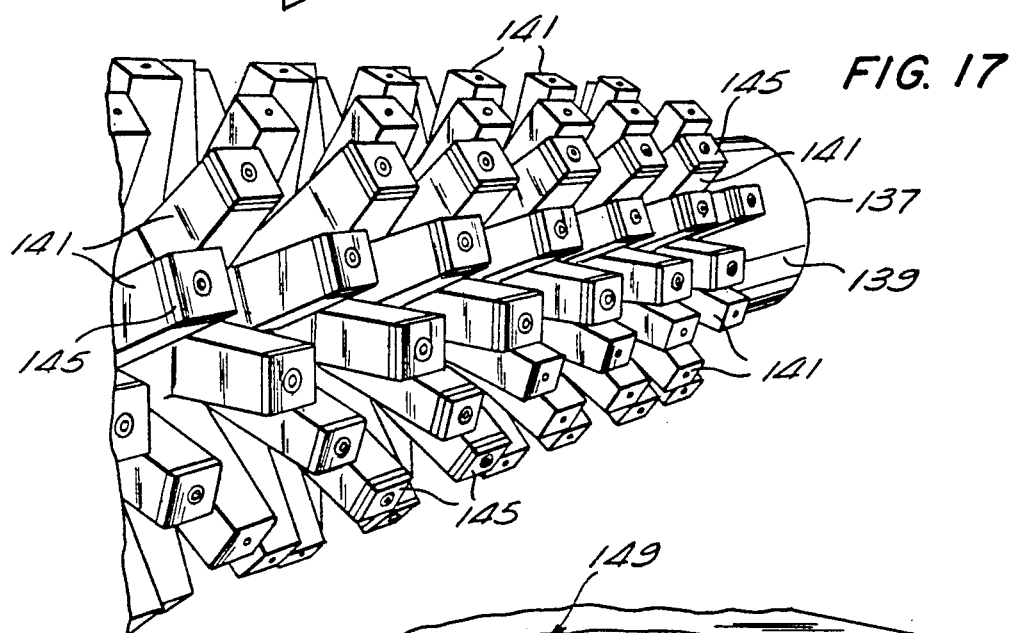
FIG. 17 is an enlarged partial perspective view illustrating, the fingers of the rollers of FIG. 16.

FIG. 16 shows an apparatus 126 for manufacturing convoluted foam mattresses. The apparatus 127 includes a pair of cooperating parallel rollers 127 and 129, each of which has a central undulated surface 131 and a cylindrical body 133, including a pair of ends, 135 and 137. As shown in FIGS. 16 and 17, at each end of the roller is an exposed cylindrical surface 139. The undulated surface 131 of each roller is formed by a plurality of fingers 141 of generally rectangular cross-section extending radially from its cylindrical body 133. The fingers 141 in vertically adjacent rows are staggered vertically a circumferential distance approximately equal to the vertical width of the fingers 141, and fingers 141 in horizontally adjacent rows are staggered horizontally a circumferential distance approximately equal to the horizontal width of the fingers 141.

Figure 18:
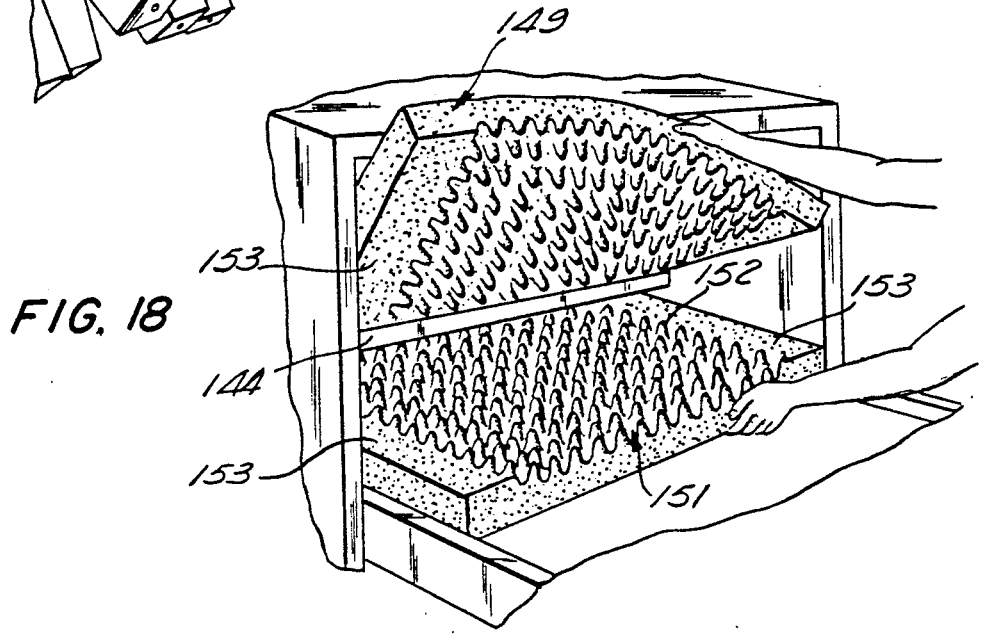
FIG. 18 is an illustration of two convoluted halves of a block after insertion into the apparatus of FIG. 16.

The rotating rollers, 127 and 129, compress and drive a foam block 143 against the cutter (a guard 144 for which is shown in FIG. 18). The upper roller 127 rotates counterclockwise and the lower roller 129 rotates clockwise in a synchronized manner so that the fingers 141 of the respective rollers are opposed by the spaces between the fingers of the opposite roller. In addition, the cylindrical surfaces 139 of the ends, 135 and 137 of the upper roller 127 are opposed by the cylindrical surfaces 139 of the respective ends, 135 and 137, of the opposite roller 129. All fingers 141 on a given side of, and vertically adjacent to, the spaces of one roller have an effective height equal to the effective height of the finger of the opposing roller which opposes the space. As shown in FIG. 17, the radial height of most of the fingers 141 is equal. Selected fingers 141, however, have a greater effective radial height as a result of one or more flat, rectangular caps 145 or plates being secured to the outer end of the finger.

As shown in FIG. 18, after the foam block 143 is compressed between the rollers, 127 and 129, it is driven against the cutter (not shown) which slices the block into halves, 149 and 151, which are a perfect mirror image of one another, so that each peak 152 of one half corresponds to an adjacent peak of equal size on the other half. However, variance in the effective height of the fingers 141 results both in peaks with varying peak thicknesses and valleys with varying valley thicknesses. Because the mattress is cut from a single block, however, the sum of the valley thicknesses and the corresponding peak thicknesses will equal a constant, so long as the block being cut is of uniform thickness. Likewise, the cylindrical surfaces 139 of the ends of each roller compress the foam in identical amount, so that the portion of the block 143 compressed between the cylindrical surfaces 139 of the rollers is flat, with each portion of the mattress corresponding to the cylindrical surface of the ends of the rollers forming an elongate rail 153 of identical thickness extending the length of the mattress.

The tops of the peaks formed by the cooperating undulating surfaces are then removed with a band saw or other suitable cutting device at a point midway between the tops of the peaks and the floor of the valleys, in the manner illustrated in FIG. 6, leaving an elongate rectangular mattress 155 (FIG. 19-20) with a flat, solid, lower face 157 and a substantially flat, upper face 159 comprised of the flat tops of a plurality of peaks 161 and a pair of elongate rails 153 extending the length of the mattress. As shown in FIG. 19, the portion of the mattress between the rails 153 comprises adjacent rows of peaks 161 of generally rectangular cross-section, each of which are separated by a plurality of valleys 162, also generally rectangular cross-section. Since the peaks 161 in adjacent rows are staggered, the overall effect is a checker-board pattern with two flat elongate borders formed by the mattress' two rails 153.

By increasing the effective height of the fingers which correspond to the areas of the pad supporting the shoulder and tail portions of the body, taller peaks and lower valleys are formed in those areas of the mattress. By evening out the heights of the peaks 161 by topping them off at a certain height, one is left with a smaller volume of foam in the shoulder and tail support areas to resist the weight of those respective portion of the body and, as a result, the mattress provides less resistance to these heavier body portions, thereby increasing the ability of the mattress to conform to the anatomy of the user.

Referring to FIG. 19, the mattress 155 manufactured in accordance with the principles of the present invention desirably has a thickness in excess of 5 inches, an overall length of between 30 and 90 inches and an overall width of between 20 and 90 inches, depending upon the length and width of the bed frame, and the length and width of the box springs being utilized. For specialty beds, the length could vary between 30-90 inches and the width could vary between 20-90 inches. Likewise, the flat rails 153 of the mattress 155 desirably have a width of between 2 and 6 inches and may extend over any portion of the length of the mattress, but desirably at least half of the mattress' length and, preferably, the entire length of the mattress. The rails 153 have a greater volume of foam per unit area, and provide an area of increased resistance, to provide support when getting on to or off of the mattress. In the illustrated mattress the rails 153 have a width of 3 inches and extend the length of the mattress. The illustrated mattress has a length of approximately 72 inches and a width of approximately 35 inches.

A mattress manufactured in accordance with the principles of the present invention can alternatively be designed so that breaks in the flat rails are positioned to correspond with the hinge points about which most hospital beds are bendable. Such breaks in the flat rails, if configured to the same peak and valley dimensions of the general support area of the mattress make the mattress easier to bend with the hinged bed at that point.

Between the mattress rails 153 is a general support area 163. The general support area surrounds a shoulder support area 165 and a tail support area 167 which are positioned to correspond to the normal position of the shoulder and tail portions of the body of the intended user. The shoulder support area 165 of the illustrated mattress is spaced 12 inches from one end of the pad, it is centered between the sides of the mattress and has a width of 28.35 inches and a length of 14.85 inches. The width and length of the shoulder support area 165, as well as its shape may vary, but preferably the width is between 25 and 33 inches, the length is between 12 and 17 inches and the shape is generally that of a mushroom. There is a gap of 6 inches between the shoulder and tail support areas, 165 and 167, respectively, of the mattress. The tail support area 167 of the illustrated mattress is elliptical in shape, it is centered between the sides of the mattress and has a width of between 17.55 inches and a length of 12.15 inches This spaces the tail support area 167 27 inches from the other end of the mattress. As with the shoulder support area 165, the width and length of the tail support area 167, as well as its shape, may vary, but preferably, the width is between 15 and 20 inches, the length is between 10 and 17 inches, and the area is generally elliptical or circular in shape.

In some applications, it may be desirable to use a longer foam block in manufacturing the mattress, so as to take advantage of the difference between the circumference of the rollers, 127 and 129, and the length of the block. As will be readily appreciated, this will result in a greater angular rotation of the rollers, 127 and 129, to cause, for example, a repeat of the shoulder support area pattern. Where block length is planned to exceed the roll circumference, a portion of the shoulder support area can be designed to provide for an additional heel support area running approximately ⅔ of the distance across the pad involving up to the last 12" of the pad. Such a heel support area would provide a general softening of this portion of the pad and accommodate the heels and bones of the lower leg. When such alternate heel support areas are provided and configured in a fashion consistent with the peak and valley dimensions of the shoulder and tail supporting areas, more of the total weight of the lower leg will be supported by the back of the patient's legs redistributing potentially high localized pressure points which typically exist at the heel and bones of the ankle. Such provisions may prove particularly beneficial to patients being treated for vascular ulcers of the lower leg.

Because the illustrated mattress possesses a flat, rectangular overall configuration, it may be difficult to determine its correct head-to-foot end orientation if covered in a permanent upholstered cover. To mitigate this potential problem, in such instances, it may be desirable to use the principles of the present invention to provide a second shoulder support area at the opposite end of the block from the first shoulder support area, so that the first and second shoulder support areas are symmetrical about the tail support area.

This modification provides the same general shoulder and tail support for the body without regard for head-to-foot end orientation. At the same time, because of the lack of body mass and projection in the general area of the back or side of the knees, there is very little increased deformation in the area of the unused shoulder support area and, no significant change in the pressures recorded at the primary bony prominent areas of the body.

Although the sizes of the peaks 161 and valleys 162 of the mattress may be varied, the convoluted portion of the illustrated mattress has a uniform distribution of peaks of square cross-section. The peaks 161 of the general support area 163, the shoulder support area 165 and the tail support area 167 all have a peak thickness of 6 inches in a square cross-section with a width of 1.35 inches. As best seen in FIG. 20, to provide the desired lower resistance and body contouring features, the valley thicknesses of the shoulder and tail support sections, 165 and 167, of the mattress are less than the valley thicknesses of the general support area 163 of the mattress. Specifically, the valley thickness for both the shoulder support area 165 and the tail support area 167 is ½ of one inch while the valley thickness for the general support area is 3 inches.

Referring now to FIGS. 21-25, the principles of the present invention can be used to manufacture an anatomically conforming bed overlay or posturizer for home health care applications.

Figure 21:
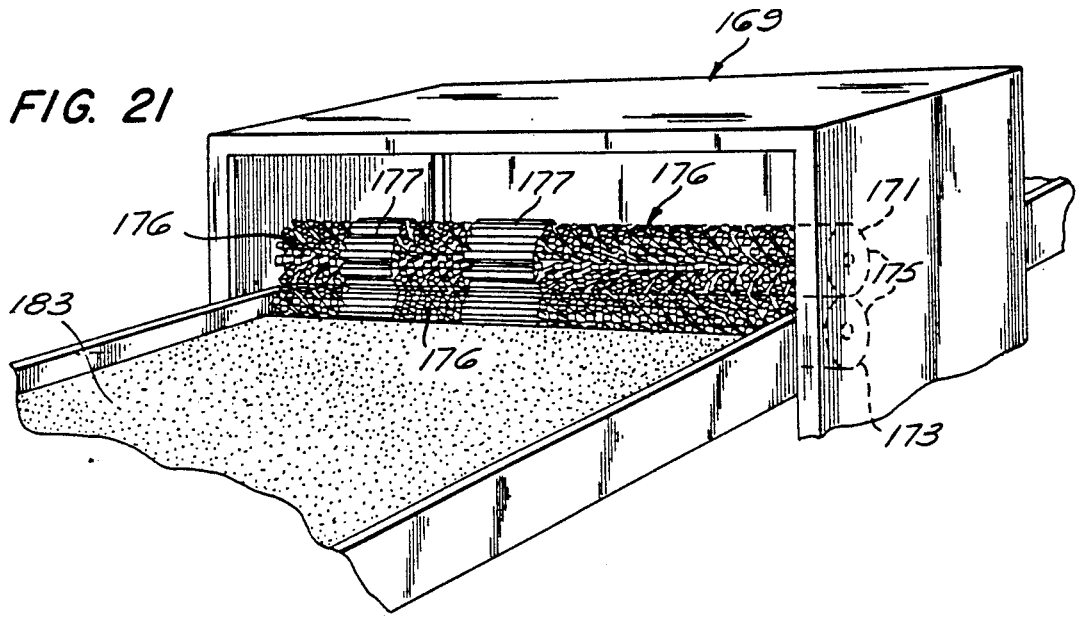
FIG. 21 is a perspective view illustrating a foam block being inserted between a pair of cylindrical rollers of a second alternative configuration.
Figure 22:
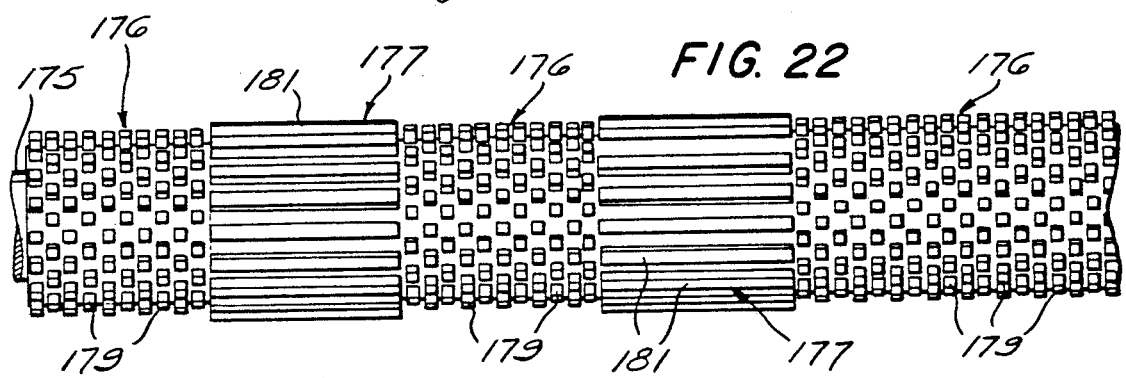
FIG. 22 is an enlarged partial perspective view illustrating the fingers of the rollers of FIG. 21.

FIG. 21 shows an apparatus 169 for manufacturing convoluted foam posturizers. The apparatus includes a pair of cooperating rollers, 171 and 173, each of which has a cylindrical body 175. Each roller includes three sections 176 having an undulated surface and a pair of sections 177 formed by rows of ribs. The undulated surface of each roller is formed by a plurality of fingers 179 of generally rectangular cross-section extending radially from its cylindrical body 175. The fingers 179 are arranged in vertical and horizontal rows. The fingers 179 in vertically adjacent rows are staggered vertically a circumferential distance approximately equal to the vertical width of the fingers. Fingers 179 in horizontally adjacent rows are staggered horizontally a circumferential distance approximately equal to the horizontal width of the fingers. The ribbed sections 177 are formed by vertically spaced ribs 181, each of which extends the length of the section and extends radially outward from the cylindrical body 175 of the roller. The ribs 181 are spaced vertically from one another, a circumferential distance approximately equal to the vertical width of the ribs 181.

Advantageously, the rollers 171 and 173 are configured so that when the side of a foam block 183 is inserted between the rollers, the rollers, 171 and 173, form a constant pattern, regardless of the width of the block 183. This enables the same rollers to be utilized to form posturizers having a width corresponding to a twin, queen or king-size bed.

Figure 23:
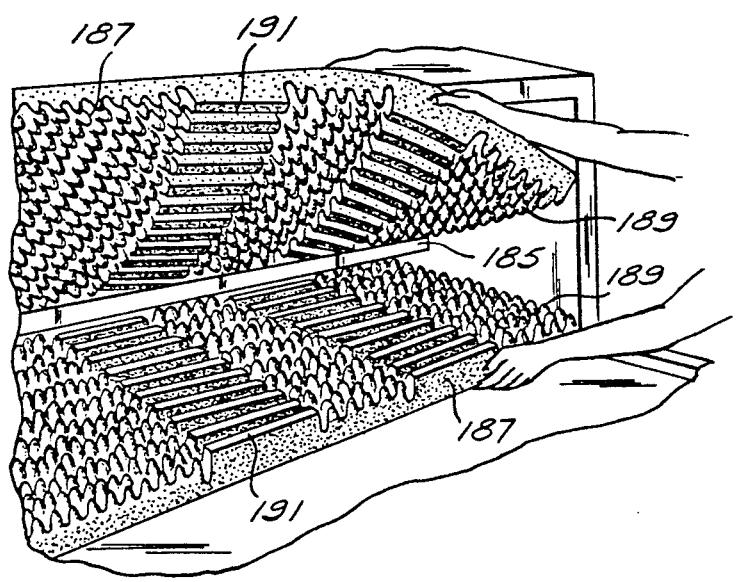
FIG. 23 is an illustration of two convoluted halves of a block after insertion into the apparatus of FIG. 21.

The rotating rollers 171 and 173 compress and drive the foam block 183 against a cutter (a guard 185 for which is shown in FIG. 23). As shown in FIG. 21, the upper roller 171 rotates counterclockwise and the lower roller 173 rotates clockwise. This rotation is synchronized so that the fingers 179 of the respective rollers are opposed by the spaces between the fingers of the opposite roller, rather than directly by its fingers 179. Likewise, the ribs 181 of the upper roller 171 are opposed by the spaces between the ribs 181 of the lower roller 173, rather than directly by its ribs 181. As best seen in FIG. 21, the effective height of each of the fingers 179 is equal and the radial height of each of the ribs 181 is equal, although the effective height of each of the ribs 181 is greater than the effective height of each of the fingers 179.

Referring to FIG. 23, after the foam block is compressed between the rollers, it is driven against the cutter (not shown) which slices the block into halves 187. The resulting halves 187 are a perfect mirror image of one another with each peak 189 of one half corresponding to an adjacent peak 189 of equal size on the other half, and each rib 191 of one half corresponding to an adjacent rib 191 of equal size on the other half. Since the effective height of each of the fingers 179 is equal, each peak 189 has an identical peak height and each valley 193 has an identical valley thickness. Likewise, since the effective height of each of the ribs 177 is equal, each rib 191 of the posturizer has an identical peak height and each valley has an identical valley thickness.

The tops of the peaks and ribs are removed with a band saw or other suitable cutting device at a point midway between the tops of the peaks and the floor of the valleys leaving an elongate rectangular posturizer 195 (FIG. 24-25) with a flat, solid, lower surface 197 and a substantially flat, upper surface 199 comprised of the flat tops of the peaks 189 and the flat tops of the ribs 191. As shown in FIG. 24, the posturizer is formed by a head support area 201 adjacent one of the ends of the posturizer for supporting the head of a body, a shoulder support area 203 adjacent the head support area 201 for supporting the shoulder portion of a body, a middle back support area 205 adjacent the shoulder support area 203 for supporting the middle back portion of a body, a tail support area 207 adjacent the middle back support area 205 for supporting the tail section of a body and a leg and feet support area 209 adjacent the tail support area 207 and the other end of the posturizer for supporting the legs and feet of a body. The head support area 201, the middle back support area 205 and the leg and feet support area 209 are formed by adjacent rows of peaks 213 of generally rectangular cross-section, each of which are separated by valleys 215, also of generally rectangular cross-section. The overall affect of the peaks and valleys is a checkerboard pattern, with the corners of the peaks 213 in adjacent rows connected by webbing extending between the peaks to the floor of the valleys 215.

In contrast, the shoulder support area 203 and the tail support area 207 are formed by rows of horizontally spaced longitudinally extending ribs 217, wherein each rib is separated from the adjacent rib 217 by a longitudinally extending valley 219. The overall affect of the ribs and valleys is a corrugated pattern.

In previous embodiments, the effective height of the fingers which corresponded to the areas of the pad supporting the shoulder and tail sections of the body have been increased to form taller peaks and lower valleys in those areas of the pad. By topping off the peaks at a certain height, one was left with a smaller volume of foam to resist the weight of that portion of the body.

Since the effective height of the ribs 181 of the rollers is greater than the effective height of the fingers 179, the ribs have a greater peak height and valleys of lower valley thickness than the peaks and valleys formed by the fingers. After the tops of the ribs and peaks are removed, the shoulder and tail support areas, formed by the rows of ribs 217 and valleys 219, have a lower foam content (i.e., a smaller amount of foam of uniform density per unit volume) than the head, middle back and leg and feet support areas 201, 205, and 209, respectively, formed by the adjacent rows of peaks 213 and valleys 215. Accordingly, the shoulder and tail portions of the body are more able to overcome the resistance of the posturizer and sink into the shoulder and tail support areas 203 and 207, thereby increasing the surface area of the posturizer in contact with the shoulder and tail portion of the body and diminishing the level of pressure exerted on the skin per unit area. Likewise, as the shoulder and tail portion of the body protrude farther into the shoulder and tail support areas, 203 and 207, of the pad, the pressure of the head, middle back and leg and feet support areas 201, 205 and 209 on the less protruding portions (e.g., the side) will increase, thereby relieving pressure from the tail and shoulder portions of the body.

Referring to FIG. 24, the anatomically conforming posturizer 195 will generally have an overall length of between 60-90 inches and a width of between 25-40 inches, depending upon the length and width of the mattress being covered, and a thickness of between 1-3 inches. Further, for specialty beds, the length may vary between 30-90 inches and the width may vary between 20-90 inches.

The illustrated posturizer 195 has a length of approximately 72 inches and a width of approximately 35 inches. The leg and feet support area 209 has a length of approximately 29 inches. The tail support area 207 has a length of approximately 11 inches. The middle back support area 205 has a length of approximately 9 inches. The shoulder support area 203 has a length of approximately 15 inches, and the head support area 201 has a length of approximately 9 inches. Further, the posturizer has a thickness of 2 inches and, therefore, a uniform peak height of 2 inches, a valley thickness of ¼ inch in the shoulder and tail support areas 203 and 207, and a valley thickness of 1¼ inches in the head, middle back and leg and feet support areas 201, 205 and 209. Naturally, the length and thickness of the support areas may vary depending upon the average size of the body to be supported.

What is claimed is:

1. An elongate convoluted foam pad for supporting a reclining human body on a bed, comprising:
    a shoulder support area for supporting the shoulder portion of a body formed by peaks arranged in rows, wherein each peak has a flat top and is spaced from any adjacent peak in the same row by a valley;
    a tail support area for supporting the tail portion of said body formed by peaks arranged in rows, wherein each peak has a flat top and is spaced from any adjacent peak in the same row by a valley; and
    a general support area surrounding said shoulder support area and said tail support area formed by peaks arranged in rows, wherein each peak has a flat top and is spaced from any adjacent peak in the same row by a valley, and wherein each of said peaks has a substantially uniform peak thickness and the average valley thickness of said valleys in said shoulder support area and the average valley thickness of said valleys in said tail support area are less than the average valley thickness of said valleys in said general support area.

2. The pad of claim 1, wherein all of said substantially flat tops are included in a single plane.

3. The pad of claim 2, wherein said pad is formed from a polyurethane foam having a density of between one and three pounds per cubic foot.

4. The pad of claim 3, wherein said peaks have a peak thickness of greater than one inch.

5. The pad of claim 4, wherein some of the corners of said peaks are connected to the corners of other peaks by webbing.

6. The pad of claim 5, wherein at least some of said webbing connecting some of said peaks is cut to provide a locale of decreased resistance to pressure.

7. A convoluted foam pad for supporting a human body on a bed, comprising:
    a general support area;
    a shoulder support area; and
    a tail support area, each of said areas comprising adjacent rows of peaks having flat tops and generally rectangular cross sections, said peaks in each row being separated by valleys and said peaks in adjacent rows being staggered, said valleys in said general support area having a greater average valley thickness than the average valley thickness in said shoulder support area and a greater average valley thickness than the average valley thickness in said tail support area, said peaks and said valleys forming a checkerboard pattern wherein the corners of said peaks in adjacent rows, are connected by webbing.

8. The pad of claim 7, wherein at least some of said integrally formed corners of said peaks in adjacent rows have been separated to decrease the resistance of the locale including the separated peaks to pressure.

9. An elongate convoluted foam mattress having a pair of opposing ends and a pair of longitudinally extending sides, comprising:
    a shoulder support area for supporting the shoulder portion of a body formed by peaks arranged in rows, wherein each peak has a flat top and is spaced from any adjacent peak in the same row by a valley;
    a tail support area for supporting the tail portion of said body formed by peaks arranged in rows, wherein each peak has a flat top and is spaced from any adjacent peak in the same row by a valley;
    a general support area surrounding said shoulder support area and said tail support area formed by peaks arranged in rows, wherein each peak has a flat top and is spaced from any adjacent peak in the same row by a valley, and wherein each of said peaks has a substantially uniform peak thickness and the average valley thickness of said valleys in said shoulder support area and the average valley thickness of said valleys in said tail support area are less than the average valley thickness of said valleys in said general support area; and
    a pair of rails extending longitudinally along said sides of said mattress.

10. The mattress of claim 9, wherein said rails extend along at least half of the length of said mattress.

11. The mattress of claim 10, wherein said rails comprise solid blocks of foam.

12. The mattress of claim 11, wherein said mattress has an overall thickness in excess of five inches.

13. A critical care convoluted foam mattress overlay, comprising:
- a shoulder support area for supporting the shoulder portion of a body formed by peaks arranged in rows, wherein each peak has a flat top and is spaced from any adjacent peak in the same row by a valley;
- a tail support area for supporting the tail portion of said body formed by peaks arranged in rows, wherein each peak has a flat top and is spaced from any adjacent peak in the same row by a valley; and
- a general support area surrounding said shoulder support area and said tail support area formed by peaks arranged in rows, wherein each peak has a flat top and is spaced from any adjacent peak in the same row by a valley, and wherein each of said peaks has a substantially uniform peak thickness and the average valley thickness of said valleys in said shoulder support area and the average valley thickness of said valleys in said tail support area are less than the average valley thickness of said valleys in said general support area, and said peaks have a peak thickness of between three and five inches.

* * * * *